March 7, 1944.  E. LOHMANN  2,343,310
FRUIT AND VEGETABLE COMMINUTING MACHINE
Filed Sept. 2, 1941  2 Sheets-Sheet 1
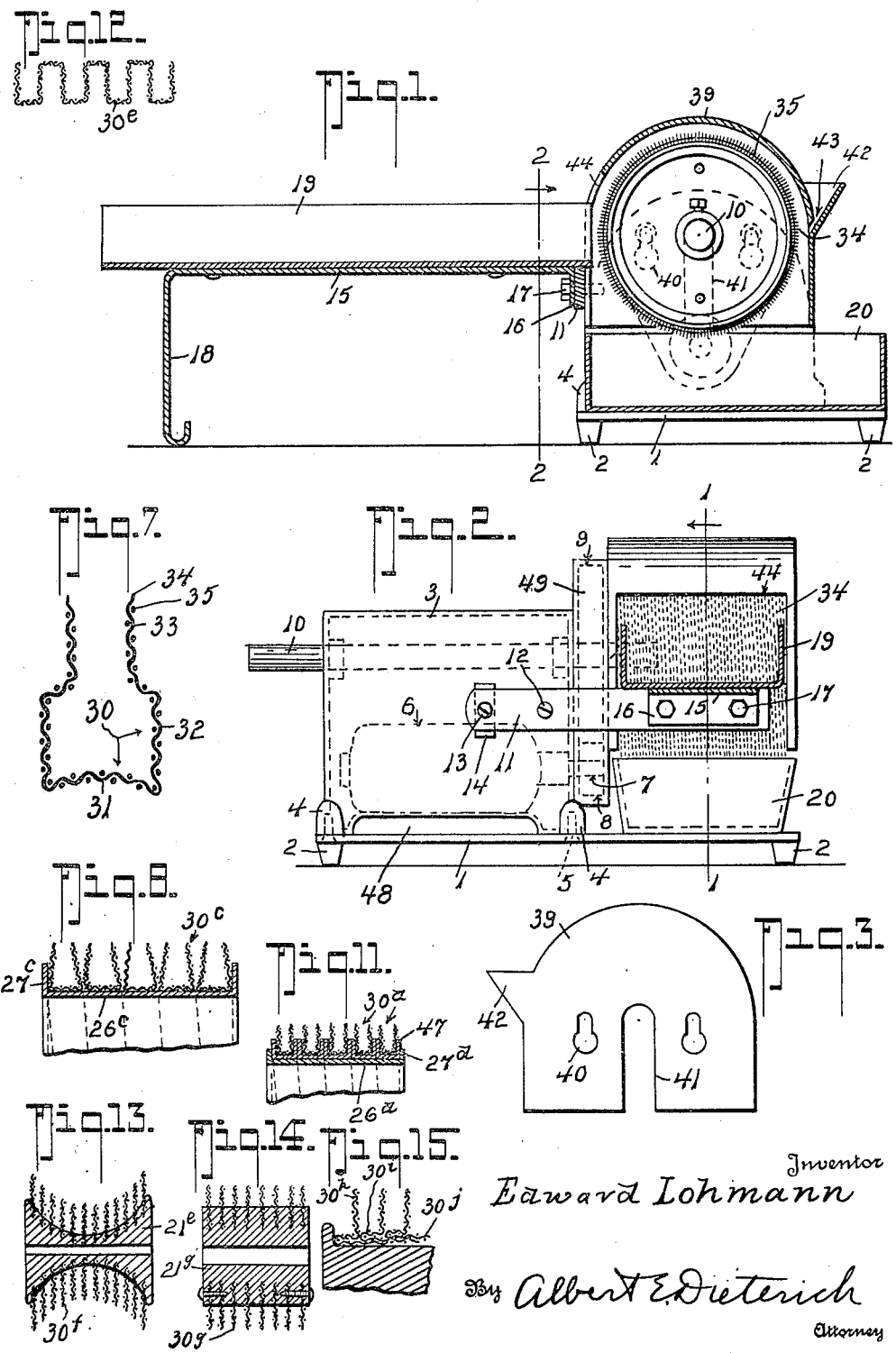

March 7, 1944.  E. LOHMANN  2,343,310
FRUIT AND VEGETABLE COMMINUTING MACHINE
Filed Sept. 2, 1941  2 Sheets-Sheet 2
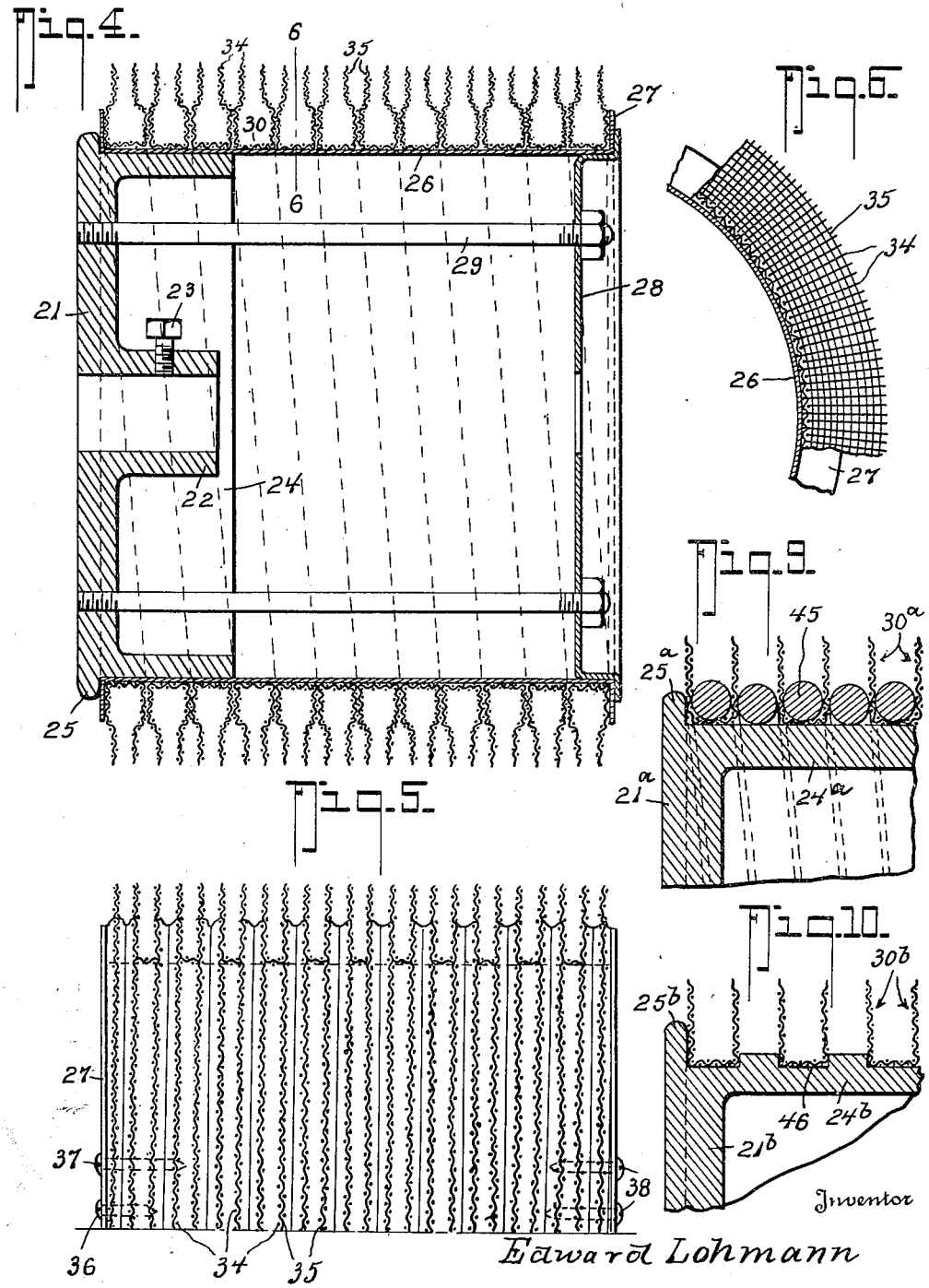
Inventor
Edward Lohmann
By Albert E Dieterich
Attorney Patented Mar. 7, 1944

2,343,310

UNITED STATES PATENT OFFICE 2,343,310

FRUIT AND VEGETABLE COMMINUTING MACHINE

Edward Lohmann, Greenville, Ohio

Application September 2, 1941, Serial No. 409,285

10 Claims. (Cl. 146—89)

My present invention relates to machines for removing the skins from fruits and vegetables, and it has for an object to provide a greatly improved machine by the use of which one may not only remove the skins of fruits and vegetables, but may divide the fruits or vegetables, including the skins, into a fine pulpy (dust-like) mass which may be eaten without chewing.

Further, it is an object to provide a machine of the character stated with a special type of comminuting wheel which will be economical to manufacture, will be of long life, and which will effectively serve its intended purposes.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 illustrates a preferred form of my invention, the section being taken on the line 1—1 of Fig. 2.

Fig. 2 is a vertical cross section on line 2—2 of Fig. 1.

Fig. 3 is a detail elevation of the wheel guard or cover.

Fig. 4 is an enlarged vertical section of the preferred form of the wheel comprising a major part of my invention.

Fig. 5 is a detail plan view of one-half of the wheel rim and the comminuting element carried thereby.

Fig. 6 is a detail section on the line 6—6 of Fig. 4.

Fig. 7 is a further enlarged detail cross-section of the comminuting element before it has been wound on the wheel rim or drum.

Fig. 8 is a detail section showing, on a reduced scale, a modification of the invention.

Fig. 9 is a detail section showing, on a larger scale, a third embodiment of my invention.

Fig. 10 is a detail sectional view of a further modification of my invention.

Fig. 11 is a detail section, on a reduced scale, of a fourth modification.

Fig. 12 is a detail edge view of a modified screen form hereinafter referred to.

Figs. 13, 14 and 15 are detail sectional views of other modifications of my invention.

In the drawings, in which like numbers and letters of reference indicate like parts in all the figures, 1 represents a suitable base which, preferably, is provided with rubber feet 2 and on which is mounted a suitable high-speed electric motor 6 and a motor casing 3, which is attached to the base 1 by screws 5 passed through the base into corner enlargements 4 of the casing 3.

The motor has a drive shaft 7 which carries a pinion 8 to mesh with a gear 9 on a driven shaft 10. In order to keep down noise, either the pinion 8 or gear 9 may, preferably, be made of fibre.

The casing 3 has air openings 48 for ventilating the motor. The pinion 8 and gear 9 are located in a gear housing 49 which may contain a suitable lubricant and which is suitably secured to the motor casing 3 (see Fig. 2).

The shaft 10 projects through the gear box and to this projecting end the rotating comminuting wheel 21 is secured by a set screw 23 carried by the hub 22 of the wheel. The construction of the wheel will be later explained.

A bracket 11 is secured to the casing 3 by screws 12 and 13, a spring washer 14 being interposed between casing 3 and bracket 11 on screw 13 for adjustment purposes. The bracket 11 has a trough support 15 attached to it by means of cap screws 17 that pass through the end 16 of the support. The other end of the support is formed into a leg 18. A suitably shaped trough is riveted, or otherwise secured, to the support 15. The trough is adjustable for fine adjustment, to and from the periphery of the wheel, by turning screws 13 and 12. To catch the comminuted material a suitable pan 20 is placed on the base 1 beneath the wheel. A water receiver 42 (Fig. 1) is provided from which holes 43 deliver water to the wheel.

The wheel

The wheel, which constitutes the principal part of my invention, generically consists of a drum or cylinder on whose periphery is spirally wound a strip 30 of wire mesh, the cross section of which is of general U or channel shape. Preferably, in forming this strip I take a wire mesh of suitable gauge wires and cut it into a strip of such width that when formed by suitable means into a channel strip (Fig. 7) it will provide a base portion 31, parallel side portions 32 and inwardly offset parallel side portions 33. The cross wires 34, when the strip is formed as a channel strip and wound on its support, will lie radially of the axis of the wheel while the longitudinal wires 35 will lie approximately concentric with the axis of the wheel and with each other (Fig. 6).

Referring now to Figs. 4, 5 and 6, which show the preferred embodiment of my invention, it will be seen that the wheel has a fellow 24 on which is securely mounted a rim 26 having side or end flanges 27. The rim is secured to the fellow by means of a cup-like flanged disc 28 and stud bolts and nuts 29, the wheel including a flange 25 between which and the flange of the disc 28 the rim 26 is clamped.

The channel strip 30 has one end flattened or punched together and held by a screw 36. After anchoring said end to the screw 36 (the screw being advanced through the flange 27, Fig. 5, only far enough to hold said end) the strip is wound about the rim and its other end is also flattened or tapered and secured to the opposite rim flange 27, Fig. 4, by screws 38. All screws 36, 37 and 38 are finally screwed in so as to pass through at least two winds of the strip. Of course, instead of using screws to secure the spirally wound strip in place, spot welding may be resorted to, or any other suitable means may be used.

Instead of shaping the mesh strip into the cross sectional form of Fig. 7, it may be shaped as shown in Fig. 8, i. e., with straight sides inwardly converged enough so that when the channel strip 30ᶜ is wound on the rim 26ᶜ between its flanges 27ᶜ (Fig. 8) the peripheral edges will lie spaced approximately equal distances apart.

Another modification is shown in Fig. 11. In this embodiment a U-shaped sheet-metal strip 47 is first wound on the rim 26ᵈ between its flanges 27ᵈ, and then a U-shaped mesh channel strip 30ᵈ is wound on the strip 47. The adjacent side of the strip 47 serves to space the strip 30ᵈ so that its peripheral edges will lie approximately equal distances apart.

Instead of using a channel strip of mesh wire, if desired a strip of mesh wire 30ᵉ may be given a zig-zag form (Fig. 12) and then wound edgewise on the rim.

A further embodiment of my invention is depicted in Fig. 9. In this form simple U-shaped strips 30ᵃ are wound on a drum 24ᵃ and held in place by a wire 45 wound tightly on the channel strip, the ends being suitably secured to the drum in any known way.

Fig. 10 shows a still further modification in which the drum 24ᵇ has a spiral groove cut in its periphery in which the mesh wire channel strip is wound.

Fig. 13 shows a modification using flat strips 30ᶠ set edgewise in a groove in a wheel having a concaved periphery, while Fig. 14 shows a modification in which the flat strips 30ᵍ are set into a groove of a wheel 21ᵍ of cylindrical form. The strips 30ᶠ, 30ᵍ may be woven with the radial wires tempered hard, while the annular wires are of softer material if desired.

The flat strips may be wound edgewise about an ungrooved periphery of a flanged wheel, such as shown in Fig. 9, the convolutions being packed together in contact and held so by any suitable means. The cutting points of the woven strip will then lie apart (crosswise of the wheel) a distance equal to the thickness of the strip and about twice that distance apart around the periphery of the wheel.

Fig. 15 shows another modification in which the strip 30ʰ is bent into an angular or ⌐-form in cross section and wound about the periphery of the wheel with the base portions 30ⁱ and 30ʲ overlapping.

I am aware that peelers having rotatable wheels with wire bristles have heretofore been proposed, but such wheels are objectionable in a number of respects. For instance, due to the rapid flexing of the bristles, pieces of the same sometimes break off and become embedded in the food. These sharp metallic pieces, if eaten, endanger the health of the person by irritating and sometimes puncturing the alimentary canal. My wheel eliminates such danger as the free ends of the wires 34 are short (the length of the mesh opening or less) and these ends or points are securely braced by the circumferential wires 35 so that no substantial bending or flexing of the points takes place.

A wheel constructed according to my invention can be made on a sufficiently large scale for the machine to be used for industrial purposes to abrade wood, rubber and metals, as wire mesh of any gauge wires desired may be used according to the work to be done by the machine. Large diameter wheels with stiff, heavy wire bristles cannot be efficiently used for the latter purposes as the bristles would bend and would soon become unequally spaced or break off.

A further advantage of my construction of wheel using wire mesh (such as woven wire, for example) is that after the points of the wires 35 wear down, by removing the outermost wire 35 (Figs. 6 and 7) a new set of points becomes available—and so on until the periphery of the rim is reached.

By using fine gauge wire in the mesh a wheel of small diameter for domestic use in comminuting fruits and vegetables can be made so that the food can be so finely divided that the resultant mass may be used for infant feeding or may be eaten by elderly persons who are without teeth.

For domestic use, mesh composed of stainless steel wire, or ordinary steel wire cloth, enameled after weaving, can be used, since there is no bending of the wire, when once on the wheel, to crack the enamel.

As the wheel revolves at such high speed as to be self-cleaning, the machine can be used on fruits and vegetables without first washing the wheel.

Shaft 10 may have the other end projected beyond the casing 3 for the purpose of attaching other implements thereto, if desired.

Other advantages of my invention will no doubt occur to those skilled in the art, and it is thought that from the foregoing description, taken in connection with the accompanying drawings, the construction and operation of the machine will be clear to those skilled in the art to which it relates.

Other modifications of the invention will, no doubt, occur to those skilled in the art, and I do not wish it to be understood that I limit myself to the several embodiments shown and described, but include all such as come within the scope of the appended claims.

What I claim is:

1. In a machine of the class described, a wheel having a periphery, and wire mesh bent to approximately U-shape in cross section encircling said periphery and secured thereto, the sides of the U-shaped wire mesh extending in a radial direction so that the ends of the wires of the arms or sides of the U serve to do the comminuting.

2. In a machine of the class described, a wheel, and a strip helically wound on and held in place on said wheel, said strip being composed of wire mesh bent longitudinally into channel form, the cross wires of the strip lying in planes radial to the axis of the wheel and the longitudinal wires of the strip lying concentrically to the said axis, the ends of the cross wires serving to do the comminuting.

3. In a machine of the class described, a wheel, and a strip helically wound on and held in place on said wheel, said strip being composed of wire mesh bent longitudinally into channel form, the cross wires of the strip lying in planes radial to the axis of the wheel and the longitudinal wires of the strip lying concentrically to the said axis, said strip including a base portion and sides, the sides having parallel portions adjacent the base portion and inwardly offset outer portions, the ends of the cross wires serving to do the comminuting.

4. In a machine of the class described, a wheel, a strip helically wound on and held in place on said wheel, said strip being composed of wire mesh bent longitudinally into channel form, the cross wires of the strip lying in planes radial to the axis of the wheel and the longitudinal wires of the strip lying concentrically to the said axis, and means including a wire wound in the channel to hold the channeled strip in place.

5. In a machine of the class described, a wheel, and a strip helically wound on and held in place on said wheel, said strip being composed of wire mesh bent into channel form, the cross wires of the strip lying in planes radial to the axis of the wheel and the longitudinal wires of the strip lying concentrically to the said axis, said wheel including a spirally grooved fellow in which groove the channeled strip is wound, and means to hold said strip in place in said groove, the ends of the cross wires serving to do the comminuting.

6. In a machine of the class described, a wheel including an annular active element composed of wire mesh bent into zig-zag form and set edgewise around the periphery of the wheel with the general plane of the mesh held approximately normal to the axis of the wheel, the exposed ends of the mesh wires serving to do the comminuting.

7. In a machine of the class described, a wheel, a wire mesh strip helically located on edge on and around the periphery of the wheel, and means to secure the strip to the wheel, the exposed ends of the mesh wires serving to do the comminuting.

8. In a machine of the class described, a wheel, and a strip of wire mesh helically located on edge about the periphery of the wheel, said strip having wires radially disposed about the wheel and having wires annularly disposed about the wheel, the convolutions of the strip about the wheel being spaced apart, the exposed ends of the radial wires serving to do the comminuting.

9. In a machine of the class described, a wheel including an annular active element composed of wire mesh, one set of wires of which lie circumferentially of the wheel while the other set of wires lie radially of the wheel, the radial wires being tempered hard and their exposed ends serving to do the comminuting, and means to feed the material to be comminuted toward the wheel against said ends, while the annular wires are composed of softer metal.

10. In a machine of the class described, a rotatable comminuting wheel mounted to turn about a horizontal axis, a horizontally disposed feed trough from which the material to be comminuted is fed to the wheel, a support, a horizontally disposed bar extending parallel to the axis of the wheel and having one of its ends secured beneath and to the trough adjacent the wheel to support the trough, a screw for mounting said bar on said support to one side of the trough, and a second spring loaded screw means spaced outwardly from the first screw relative to the trough and connecting the bar to said support for adjusting the end of the trough adjacent the wheel toward or from the periphery thereof.

EDWARD LOHMANN.